(12) United States Patent
Bohaty et al.

(10) Patent No.: US 6,264,858 B1
(45) Date of Patent: Jul. 24, 2001

(54) METHOD FOR RADIATION CONVERSION WITH BISMUTH BORATE CRYSTALS

(75) Inventors: Ladislav Bohaty; Petra Becker; Holger Hellwig; Josef Liebertz, all of Cologne (DE)

(73) Assignee: FEE - Forschungsinstitut fur Mineralische und Mettallische Werkstoffe Edelsteine/Edelmetalle GmbH, Idar-Oberstein (DE)

( * ) Notice: Subject to any disclaimer, the term of this patent is extended or adjusted under 35 U.S.C. 154(b) by 0 days.

(21) Appl. No.: 09/333,585

(22) Filed: Jun. 18, 1999

(51) Int. Cl.⁷ .............................. G02B 5/20; C01B 35/10; G02F 1/35; H01S 3/10

(52) U.S. Cl. .................... 252/584; 423/263; 423/277; 423/279; 359/328; 359/342; 372/20; 372/22

(58) Field of Search .................... 423/263, 277, 423/279; 252/582, 584; 359/328, 342; 372/20, 22

(56) References Cited

U.S. PATENT DOCUMENTS

| | | | |
|---|---|---|---|
| 3,801,703 | * | 4/1974 | Bither ........................... 423/277 |
| 4,931,133 | * | 6/1990 | Gualtieri et al. ................ 423/279 |
| 5,343,327 | * | 8/1994 | Chai et al. ..................... 252/584 |
| 5,523,026 | * | 6/1996 | Chen et al. ..................... 252/582 |
| 5,684,813 | * | 11/1997 | Keszler ........................ 359/328 |
| 5,833,939 | * | 11/1998 | Kimura et al. .................. 423/277 |

OTHER PUBLICATIONS

Liebertz, Z. Kristallographie, vol. 158, p. 319, (1982).*

Blasse et al., Physica Status Solidi (b), vol. 137, pp. K–77–K81, (1986).*

Hellwig et al., Solid State Communications, vol. 109, No. 4, pp. 249–251, (1999).*

* cited by examiner

Primary Examiner—Philip Tucker
(74) Attorney, Agent, or Firm—Paul & Paul

(57) ABSTRACT

Bismuth borates in crystalline form with non-linearly optical properties. Bismuth borate crystals are used for radiation conversion. The crystal is created with non-linearly optical properties which has non-linearly optical coefficients which exceed those of crystals used hitherto in the application and which is easy, inexpensive to produce and of high optical quality.

24 Claims, 3 Drawing Sheets

METHOD FOR RADIATION CONVERSION WITH BISMUTH BORATE CRYSTALS

Figure 1:
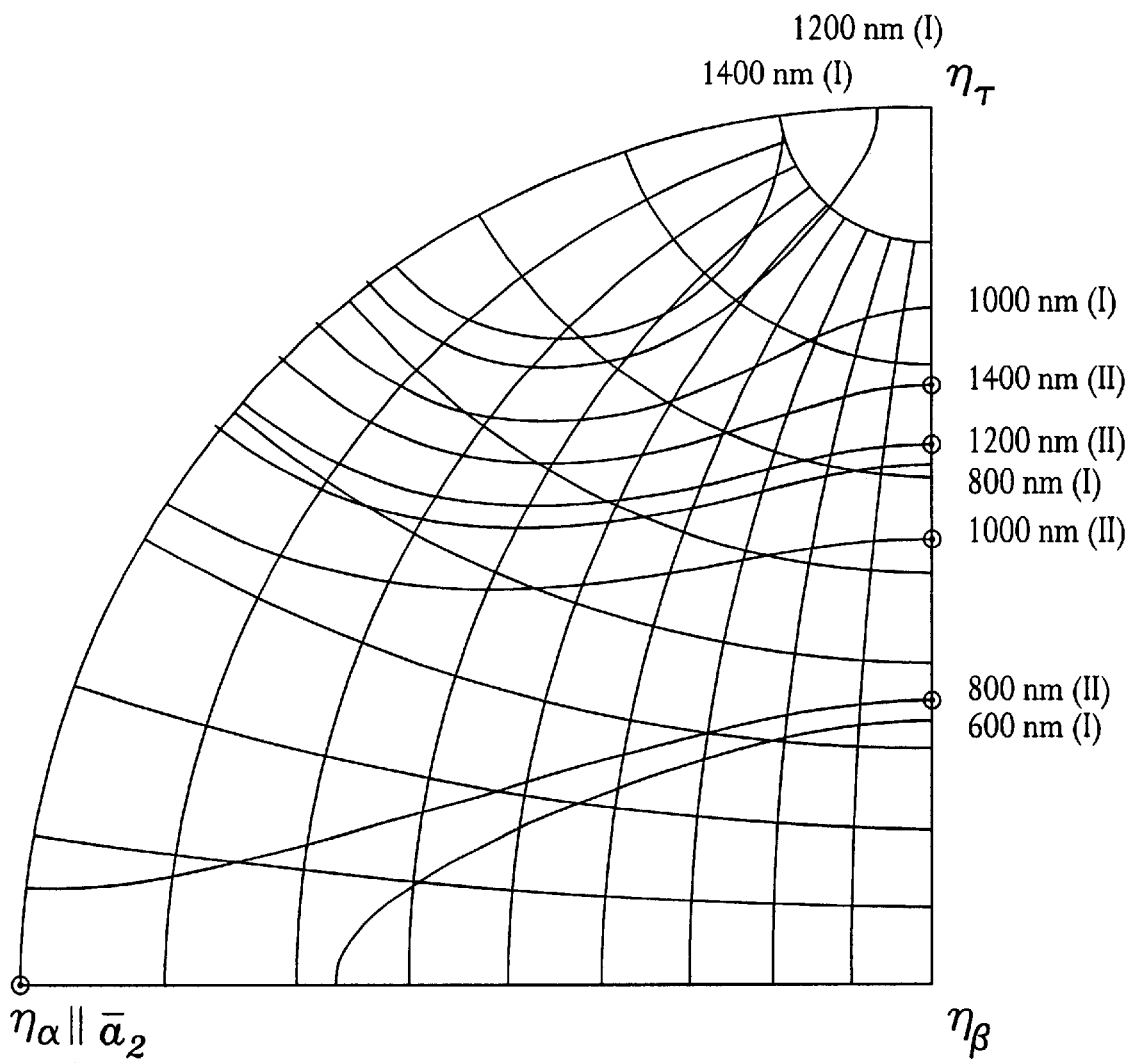

The invention relates to the production of bismuth borates in crystalline form with non-linearly optical properties. The present invention also relates to the use of bismuth borate crystals for radiation conversion.

BACKGROUND OF THE INVENTION

Radiation conversion is usually carried out because of non-linear interaction which frequently comes about because the electric field strength of the field of light irradiating a crystal is no longer negligible in comparison with the nuclear (electric) field of the material exposed to the radiation. Since the discovery of the laser in 1960, the high electric field intensities which can be achieved with these coherently radiating light sources have consequently resulted in the observation of numerous new kinds of interaction between light and material (see, for example, N. Bloembergen: Nonlinear Optics, W. A. Benjamin, New York 1965).

Crystals, which, owing to their particular non-linearly optical properties, are used for the frequency conversion, in general, of laser radiation in the 250–3000 nm wavelength range, originate from very diverse substance families, each of which has its own very specific properties. The most important types of crystal currently used are $KTiOPO_4$ (KTP), $\beta$-$BaB_2O_4$ (BBO), $LiB_3O_5$ (LBO), $LiIO_3$ and the newer compounds $CsLiB_6O_{10}$ (CLBO) and $Ca_4GdO(BO_3)_3$. Since non-linear optical processes are not only dependent upon the specific non-linear optical properties, but also upon the linear optical properties (e.g. dispersion of the powers and absorption), and, decisively, also upon the growth capacity and workability of the crystals, the types of crystals already used have various drawbacks depending upon their application.

The commercially used crystals KTB, BBO and LBO all have the drawback that they have to be grown from melt solvents. With this method, crystal growth is very slow, and several weeks or even months are needed to obtain crystals which are of a sufficient size for most applications. Moreover, with this method of growth, only a small yield of crystal volume is obtained per volume of molten mixture used. The optical quality of crystals from melt solutions is mostly inadequate because these crystals usually have micro-inclusions of melt solvents.

On the other hand, crystals with non-linearly optical properties which are grown according to the Czochralski method, the Bridgman method, or the top-seeding method, are mostly better in terms of optical quality.

Another advantage of these methods is that in a relatively short space of time far larger crystals can be grown. Examples of such crystals are CLBO, $Ca_4GdO(BO_3)_3$ or $Ca_4YO(BO_3)_3$. However, these crystals have a smaller frequency conversion efficiency because they have smaller non-linearly optical coefficients $d_{ijk}$ than the substances KTP, BBO and LBO.

The non-linear optical coefficients are shown in Table 1.

TABLE 1

| KTP[1] | BBO[1] | LBO[1] | CLBO[1] | $Ca_4GdO(BO_3)_3$[2] |
|---|---|---|---|---|
| $d_{311}$ = 1.4 | $d_{311}$ = ±0.16 | $d_{311}$ = +0.67 | $d_{123}$ = 0.95 | $d_{122}$ = 0.56 |

TABLE 1-continued

| KTP[1] | BBO[1] | LBO[1] | CLBO[1] | $Ca_4GdO(BO_3)_3$[2] |
|---|---|---|---|---|
| $d_{322}$ = 2.65 ($d_{333}$ = 10.7) | $d_{222}$ = +2.3 | $d_{322}$ = +0.85  $d_{333}$ = ±0.04 | | $d_{322}$ = 0.44 |

[1]V. G. Dmitriev et al.: Handbook of Nonlinear Optical Crystals, Springer Verlag, 2nd Edition (1997)
[2]Aka et al.: World Patent No. WO 96/26464

SUMMARY OF THE INVENTION

The aim of the present invention is therefore to create a crystal with non-linearly optical properties which has non-linearly optical coefficients which exceed those of crystals used hitherto in the application and which is easy, and, above all, inexpensive, to produce, and which has a high optical quality.

Another aim of the invention is to disclose an advantageous use of this new crystal material with non-linearly optical properties.

BRIEF DESCRIPTION OF THE DRAWING FIGURES

FIG. 1 illustrates phase matching curves for various wavelengths. Illustrated is a quadrant of the stereographic projection with the optical main axes in the form of a co-ordinate system. The respective wavelength and type of phase matching (I or II) are indicated at the edge. Open circles denote the case $d_{\mathit{eff}=0}$.

DETAILED DESCRIPTION OF THE PREFERRED EMBODIMENTS

This problem is solved according to the invention by way of monoclinicly crystallising $BiB_3O_6$ (BIBO) and it chemically easily changeable forms $Bi_{1-x}M_xB_3O_6$ (MBIBO), wherein M stands for Ga, In, Sc or one of the rare earth elements, and x is of a value between 0 and 0.5, wherein, however, the pure BIBO system is preferred. Substitutions of the remainder of the components by chemically related elements are also possible, at least in small concentrations, without adversely affecting the desired crystal properties. BIBO has a monoclinic unitary cell of space group 2, the lattice constants of which are a=7.116 Å, =4.993 Å, c =6.508 Å and $\beta$=105.62°. BIBO or MBIBO, in comparison with other substances, reveal extraordinarily large non-linearly optical coefficients.

It is also possible to grow large crystals of excellent optical quality relatively quickly from stoichiometric molten mixtures.

The preparation process is easy and inexpensive to carry out, which very much facilitates the production of optical components and clearly reduces the time spent on this.

The crystals of BIBO or MBIBO are advantageously grown from molten mixtures of stoichiometric composition in accordance with the top-seeding method. Therein, the molten mixtures are produced from mixtures in stoichiometric proportions of $Bi_2O_3$ (or (1-x) $Bi_2O_3$+x·$M_2O_3$) and boric acid $H_3BO_3$ or boric oxide $B_2O_3$. The components are mixed homogeneously in powder form and preferably melted in an air atmosphere in the platinum pot. In order to obtain crystals of maximum size and homogeneity, it is advantageous to keep the temperature of the molten condition until complete homogenisation of the molten mixture has been reached. The molten mixture is then cooled to the crystallisation temperature and then contacted with a pre-determined seed crystal. It is thereby possible to form a single crystal on the pre-determined seed crystal. The growth capacity of the crystals grown in this way is approx. 0.5–1 cm3 daily.

The grown crystals are not hygroscopic, have good mechanical stability and a high chemical resistance. Mechanical working, e.g. sawing, grinding, or polishing, is possible without any problem. BIBO, or MBIBO, is transparent to wavelengths from approx. 280 nm to above 2500 nm. The main lens powers, their orientation in the a,c-plane, and dispersion are shown in the following table, wherein the angle $\phi$ is the angle between c and $n_3^\circ$ and $n_2^\circ$ lies $\parallel$ b.

TABLE 2

| $\lambda/[\mu m]$ | $n_2^\circ$ | $n_3^\circ$ | $n_1^\circ$ | $\phi$ |
|---|---|---|---|---|
| 0.36502 | 1.8413 | 1.8826 | 2.0453 | 43.80° |
| 0.40466 | 1.8210 | 1.8585 | 2.0135 | 44.83° |
| 0.43583 | 1.8099 | 1.8453 | 1.9962 | 45.38° |
| 0.48000 | 1.7983 | 1.8316 | 1.9784 | 45.88° |
| 0.54607 | 1.7865 | 1.8180 | 1.9606 | 46.35° |
| 0.58765 | 1.7811 | 1.8118 | 1.9526 | 46.55° |
| 0.64385 | 1.7756 | 1.8053 | 1.9444 | 46.76° |
| 0.70652 | 1.7709 | 1.8000 | 1.9374 | 46.87° |
| 0.85211 | 1.7637 | 1.7915 | 1.9266 | 47.10° |
| 1.01398 | 1.7585 | 1.7854 | 1.9190 | 47.18° |
| 1.52958 | 1.7485 | 1.7732 | 1.9038 | 46.84° |
| 1.97002 | 1.7409 | 1.7638 | 1.8924 | 46.39° |
| 2.32531 | 1.7342 | 1.7551 | 1.8818 | 45.84° |

The Sellmeier coefficients are disclosed in the following list. The Sellmeier function used reads as follows:

$$n^2(\lambda_i) = A + \frac{B}{\lambda_i^2} - C - D\lambda_i^2$$

| | A | B | C | D |
|---|---|---|---|---|
| $n_1^\circ$ | 3.0740(3) | 0.0323(1) | 0.0316(3) | 0.01337(6) |
| $n_2^\circ$ | 3.1685(3) | 0.0373(1) | 0.0346(3) | 0.01750(8) |
| $n_3^\circ$ | 3.6545(4) | 0.0511(2) | 0.0371(3) | 0.0226(1) |

For the non-linear component of polarisation $P_i(2\omega)$ this gives in the second order: $P_i(2\omega)=\epsilon_o d_{ijk}E_j(\omega)E_k(\omega)$. Therein, $\epsilon_o$ represents the dielectric constant, or also the electric constant.

The non-linearly optical coefficients $d_{ijk}$ for the fundamental wavelength $\lambda^\circ=1080$ nm:

| | d/[pm/V] |
|---|---|
| $d_{222}$ | ±2.60(7) |
| $d_{211}$ | ±2.3(2) |
| $d_{233}$ | ±1.3(1) |
| $d_{231}$ | ±2.3(2) |
| $d_{112}$ | ±2.8(2) |
| $d_{332}$ | ±0.9(1) |
| $d_{312}$ | ±2.4(3) |
| $d_{132}$ | ±2.4(3) |

The cartesian reference system $\{\overline{x,y,z}\}$ relates here to the crystallographic reference system $\{a,b,c\}$ for the indexes of the coefficients $d_{ijk}$ in the conventional form: $(\overline{y}\|\overrightarrow{b,z}\|\overline{c,x}=\overline{y}\times \overline{z})$:

The component of the non-linearly optical tensor $(d_{eff})$ effectively active in a process therefore reaches percentage dependent values of up to 3.4 pm/V in BIBO in dependence on process.

BIBO or MBIBO in the form of single crystals and single-crystalline layers is therefore particularly suitable for frequency conversion processes by means of non-linear optical processes.

Further advantages, features and possible applications are illustrated with the aid of the examples and associated drawings.

EXAMPLE 1

Production of Harmonic Waves

Figure 2A:
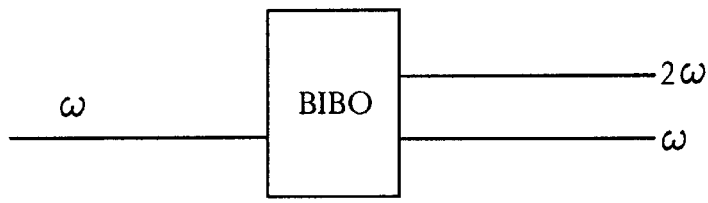
Figure 2B:
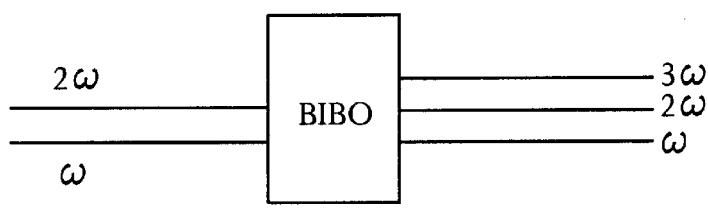
Figure 2C:
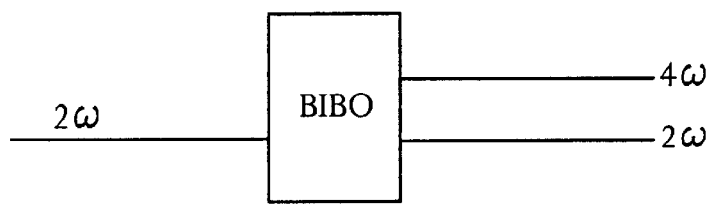
Figure 2D:
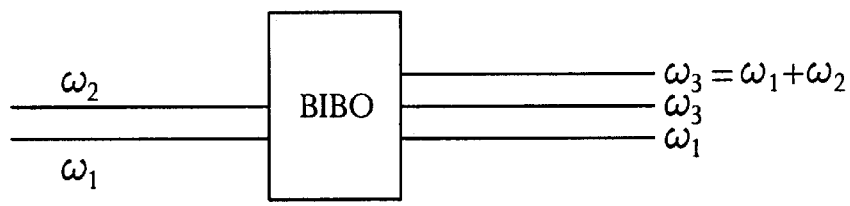
Figure 2E:
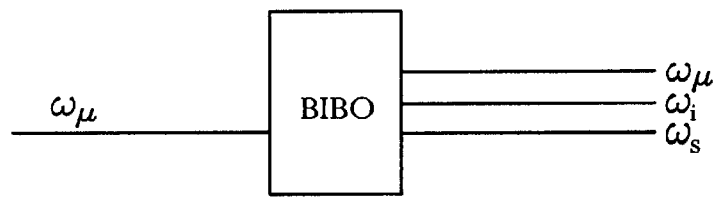
Figure 3A:
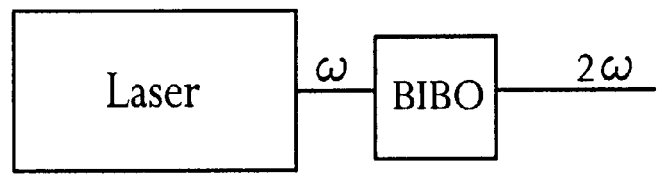
Figure 3B:
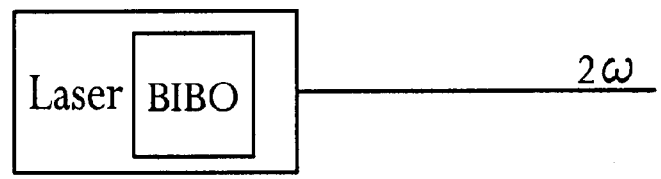

If radiation, preferably laser radiation passes through BIBO or MBIBO with the frequency $\omega$, BIBO or MBIBO can produce radiation at double the frequency $(2\omega)$ of the radiation passing therethrough (see FIG. 2a). Depending on the application, BIBO, or MBIBO, is arranged inside or outside the laser resonator (see FIG. 3). Furthermore, the crystal needs to be oriented relative to the phase adaptation (see FIG. 1) in accordance with the polarisation conditions. The relatively large double refraction of BIBO permits phase adaptation across a large wavelength range both for type I as well as for type II (type I or type II relate to the polarisation state of the fundamental wave). In general, BIBO offers the possibility of phase adaptation across the entire transparency range.

Radiation with double the frequency $(2\omega)$, the so-called second harmonic wave, can, in turn, be used with the fundamental wave $(\omega)$ to produce the third harmonic wave $(3\omega)$ (see FIG. 2). The second harmonic wave $(2\omega)$ can also be used to produce the fourth harmonic wave $(4\omega)$ (see FIG. 2c).

If the crystal is arranged inside the laser resonator, e.g. for the specific instance of frequency doubling, with the use of various filter systems (e.g. highly reflective and highly transmitting interference filters) very high conversion rates of above 80% can be achieved.

Owing to the high non-linearly optical coefficients of BIBO or MBIBO, this method can also be applied to non-pulsed laser systems and miniaturised laser systems which overall have a low output power. An example of these is laser diodes.

Furthermore, it is possible to produce composite elements in conjunction with the glass fibre technology, these composite elements causing frequency conversions within these composite systems based on BIBO or MBIBO in thin layers or waveguides, for example.

EXAMPLE 2

Frequency Mixing from various Laser Sources

For some years, solid-state lasers have been available which use laser diodes or other laser systems as pump source for optical pumping. Those which should be mentioned, in particular, are diode-pumped Nd-solid-state-lasers, titanium-sapphire lasers, or optical parametric oscillator (OPO) systems. The radiation of frequency $\omega_2$, used to pump the laser-active material, e.g. that from diode lasers (approx. 700–1000 nm) can be mixed with the direct laser radiation of the laser-active material (e.g. of the Nd-radiation at approx. 1064 nm or 1335 nm) of frequency $\omega_2$. Radiation of frequency $\omega_3$ ($=\omega_2+\omega_1$) is then produced. Using the possibilities resulting for the production of a generation of different frequencies, e.g. in the visible range, a suitable arrangement can be used to produce laser radiation in the red, blue and green colour spectrum (RGB) (see FIG. 2d).

These laser systems can then be used to produce image projection systems, for example, (Laser-TV).

EXAMPLE 3

Difference Frequency Formation and Parametric Optical Oscillators (OPO) and Amplifiers (OPA)

Exactly like sum frequency formation processes, BIBO or MBIBO can be used to produce the difference frequency of two waves of different frequency. To that end, a pump radiation of short wavelength which may, for example, originally be a higher harmonic wave, is usually converted in the crystal in two frequencies using a respectively lower frequency (see FIG. 2e). As known, this process is very dependent upon angle, and therefore depends with great sensitivity upon the radiation orientation in the crystal, so that the method can be used to realise tunable laser systems. By rotating the crystal in the resonator the laser wavelength can be varied.

The extraordinarily high conversion coefficient of BIBO or MBIBO is of very great significance with these applications.

On the basis of the same phase adaptation relationships BIBO or MBIBO can be used when considering the corresponding process of the parametric oscillator (OPO) where a pump wave of frequency $\omega_\mu$ can be used to produce a signal wave $\omega_3$ and a complementary wave $\omega_1$. Therein, $I/\omega_\mu = I/\omega_s + I/\omega_i$ phase adaptation with BIBO or MBIBO is reached by rotating the crystal, so that here too a tunable source can occur. The pump wavelength can be changed, and OPO's with various tunable ranges can thereby be produced.

What is claimed is:

1. A crystal with non-linear optical properties of the chemical composition $Bi_{1-x}M_xB_3O_6$, wherein M is selected from the group consisting of Ga, In, Sc and the rare earth elements and x is of a value greater than 0 and less than or equal to 0.5.

2. A crystal according to claim 1 characterised in that the crystal is a single crystal.

3. A method for converting the frequency of coherent radiation, the method comprising passing the coherent radiation through a crystal having the composition $Bi_{1-x}M_xB_3O_6$, wherein M is selected from the group consisting of Ba, In, Sc, and the rare earth elements, x being greater than or equal to 0 and less than or equal to 0.5.

4. A method according to claim 3 wherein the crystal is a single crystal.

5. A method according to claim 4 wherein the crystal is a polycrystal having at least one single crystal layer.

6. A method according to claim 3 wherein a laser resonator is employed, the crystal being provided within the laser resonator for doubling the frequency of the coherent radiation.

7. A method according to claim 3 wherein a laser resonator is employed, the crystal being provided outside the laser resonator for doubling the frequency of the coherent radiation.

8. A method according to claim 6 wherein the source of the coherent radiation is a Nd solid state laser.

9. A method according to claim 7 wherein the source of the coherent radiation is a Nd solid state laser.

10. A method according to claim 6 wherein the source of the coherent radiation is a laser diode.

11. A method according to claim 7 wherein the source of the coherent radiation is a laser diode.

12. A method according to claim 3 wherein the coherent radiation comprises coherent radiation from a first source having a first frequency, and coherent radiation from a second source having a second frequency, the frequency of the coherent radiation being converted by mixing the radiation from the first source with the radiation from the second source.

13. A method according to claim 12 wherein a laser resonator is employed, the mixing occurring within a laser resonator.

14. A method according to claim 12 wherein a laser resonator is employed, the mixing occurring outside a laser resonator.

15. A method according to claim 12 wherein the first source provides a fundamental wave of coherent radiation having a frequency $\omega$, the crystal being the second source and providing a first harmonic wave of coherent radiation having a frequency $2\omega$, the fundamental wave and the first harmonic wave being mixed to provide a second harmonic wave having a frequency $3\omega$.

16. A method according to claim 3 wherein the coherent radiation comprises coherent radiation from a first source having a first frequency, and coherent radiation from a second source having a second frequency, the frequency of the coherent radiation being converted to provide the difference in frequency between the radiation from the first source with the radiation from the second source.

17. A method according to claim 16 wherein a laser resonator is employed, the crystal being provided within the laser resonator.

18. A method according to claim 16 wherein a laser resonator is employed, the crystal being provided outside the laser resonator.

19. A method according to claim 3 wherein the coherent radiation comprises a pump wave of frequency $\omega_{82}$, the crystal being provided within a parametric optical oscillator.

20. A method according to claim 3 wherein the coherent radiation comprises a pump wave of frequency $\omega_{82}$, the crystal being provided within a parametric optical amplifier.

21. A parametric optical oscillator comprising a crystal having the composition $Bi_{1-x}M_xB_3O_6$, wherein M is selected from the group consisting of Ba, In, Sc, and the rare earth elements, x being greater than or equal to 0 and less than or equal to 0.5.

22. A parametric optical amplifier comprising a crystal having the composition $Bi_{1-x}M_xB_3O_6$, wherein M is selected from the group consisting of Ba, In, Sc, and the rare earth elements, x being greater than or equal to 0 and less than or equal to 0.5.

23. A tunable laser system comprising a crystal having the composition $Bi_{1-x}M_xB_3O_6$, wherein M is selected from the group consisting of Ba, In, Sc, and the rare earth elements, x being greater than or equal to 0 and less than or equal to 0.5.

24. An optical projection system comprising a crystal having the composition $Bi_{1-x}M_xB_3O_6$, wherein M is selected from the group consisting of Ba, In, Sc, and the rare earth elements, x being greater than or equal to 0 and less than or equal to 0.5.

* * * * *

UNITED STATES PATENT AND TRADEMARK OFFICE
CERTIFICATE OF CORRECTION

PATENT NO. : 6,264,858 B1
DATED : July 24, 2001
INVENTOR(S) : Ladislav Bohaty, Petra Becker, Holger Hellwig and Josef Liebertz It is certified that error appears in the above-identified patent and that said Letters Patent is hereby corrected as shown below:

Column 2,
Line 36, delete "it" and substitute -- its --
Line 44, delete "a=7.116 Å, =43993 Å" and substitute -- a=7.116 Å, b=4.993 Å --

Column 6,
Line 52, delete "$\omega_{82}$" and substitute -- $\omega_\mu$ --.
Line 55, delete "$\omega_{82}$" and substitute -- $\omega_\mu$ --.

Signed and Sealed this

Tenth Day of September, 2002

Attest:

JAMES E. ROGAN
Attesting Officer    Director of the United States Patent and Trademark Office